United States Patent
Adachi

(10) Patent No.: US 8,503,090 B2
(45) Date of Patent: Aug. 6, 2013

(54) ZOOM OPTICAL SYSTEM, AND IMAGING APPARATUS INCORPORATING THE SAME

(75) Inventor: Kanato Adachi, Kawasaki (JP)

(73) Assignee: Olympus Imaging Corp., Tokyo (JP)

( * ) Notice: Subject to any disclaimer, the term of this patent is extended or adjusted under 35 U.S.C. 154(b) by 81 days.

(21) Appl. No.: 13/134,287

(22) Filed: Jun. 3, 2011

(65) Prior Publication Data
US 2011/0299175 A1    Dec. 8, 2011

(30) Foreign Application Priority Data

Jun. 7, 2010   (JP) .................................. 2010-129617

(51) Int. Cl.
*G02B 25/00* (2006.01)
*G02B 21/02* (2006.01)
*G02B 15/14* (2006.01)

(52) U.S. Cl.
USPC ............................. 359/646; 359/661; 359/684

(58) Field of Classification Search
USPC ......... 359/645, 651, 660, 682, 684, 641–643, 359/646, 661
See application file for complete search history.

(56) References Cited

U.S. PATENT DOCUMENTS

| 7,177,094 B2 * | 2/2007 | Mihara et al. ................. 359/686 |
| 7,492,526 B2 * | 2/2009 | Sato ............................. 359/687 |
| 2006/0056047 A1 * | 3/2006 | Oshita ........................... 359/680 |
| 2009/0109545 A1 * | 4/2009 | Ohtake et al. ................ 359/687 |

FOREIGN PATENT DOCUMENTS

JP   2007-093961   4/2007

* cited by examiner

*Primary Examiner* — Thomas K Pham
*Assistant Examiner* — Brandi Thomas
(74) *Attorney, Agent, or Firm* — Kenyon & Kenyon LLP

(57) ABSTRACT

The invention provides a zoom optical system comprising at least three lens groups and designed to implement zooming by varying a separation between the respective lens groups. The zoom optical system includes, on an image plane side with respect to a stop, a lens group comprising a plurality of lenses and having positive refracting power throughout. The lens group having positive refracting power includes therein a first lens and a second lens in order from the object side, an image plane side surface of the first lens being convex toward the object side, and an object side surface of the second lens being concave toward the object side.

7 Claims, 14 Drawing Sheets

Example.1

Example.1

Example.1

Telephoto End (a)

Close Proximity to the Telephoto End (b)

Example.2

(a) Wide-Angle End (b) Close Proximity to the Wide-Angle End

Example.2

(a) Telephoto End (b) Close Proximity to the Telephoto End

Example.1

(a) Wide-Angle End (b) Close Proximity to the Wide-Angle End

Example.1

(a) Telephoto End (b) Close Proximity to the Telephoto End

Example.2

(a) Wide-Angle End (b) Close Proximity to the Wide-Angle End

Example.2

(a) Telephoto End (b) Close Proximity to the Telephoto End

ZOOM OPTICAL SYSTEM, AND IMAGING APPARATUS INCORPORATING THE SAME

BACKGROUND OF THE INVENTION

The present invention relates to a small-format zoom optical system having improved imaging capabilities, and an imaging apparatus incorporating the same.

In recent years, a bifocal changeover type imaging lens has been proposed for a small-format zoom imaging lens having fewer driving mechanisms (see JP(A) 2007-93961). The optical system set forth in Patent Publication 1 comprises three groups of negative/positive/positive profile, and is designed to implement zooming by moving only the second lens group in the optical axis direction. And unlike a commonly used zoom lens, what is required there is only to satisfy bifocal imaging capabilities at the wide-angle end and telephoto ends so that during zooming the first and third lens groups can remain fixed, making it possible to simplify the mechanism involved.

SUMMARY OF THE INVENTION

For the zoom optical system of the invention comprising at least three lens groups and designed to implement zooming by varying the separation between the respective lens groups, it is preferable to include on an image plane side with respect to a stop a lens group comprising a plurality of lenses and having positive refracting power throughout, and including a first lens and a second lens in order from the object side, an image plane side surface of the first lens being convex toward the object side and an object side surface of the second lens being concave toward the object side.

The requirements for, and advantages of such arrangement are now explained.

In the inventive zoom optical system, the lens group including the first lens and the second lens, i.e., a lens concave on its image plane side toward the image plane side and a lens concave on its object side toward the object side are located in the zoom group forming part of the imaging lens and having positive refracting power while the concave surfaces are opposite to each other so that the front principal point of the zoom lens group can be shift toward the object side, and the spacing or the so-called principal point separation between the front principal point and the rear principal point of the zoom lens group can be spread wide.

That is, an object image can be transferred to the image plane without giving rise to significant movement of the zoom lens group in the optical axis direction. Thus, the desired high magnifications can be ensured by limited movement of the lens group in the optical axis direction. It follows that sensible tradeoffs can be offered between lens size reductions all along lens length and high zoom ratios.

In addition, the principal point separation of the zoom lens group is spread so wide that the focal lengths of the lens groups located before and after it can be made long. This is preferable because power is kept low and lens thickness is reduced, contributing to size reductions and making it possible to use low refractive index vitreous material, and because sensibility to decentration remains low as well Preferably, the lens group including the first lens and the second lens should satisfy the following Condition (1):

$$-0.5 \leq (Ra1+Ra2)/(Ra1-Ra2) \leq 0.5 \quad (1)$$

where Ra1 is the radius of curvature of the image plane side surface of the first lens, and Ra2 is the radius of curvature of the object side surface of the second lens.

Condition (1) is indicative of the shaping factor of the lens group including the first lens and the second lens formed in the second lens group.

Exceeding the upper limit to Condition (1) will cause the radius of curvature of the image plane side surface of the first lens to become too large to locate the front principal point more on the object side. Being short of the lower limit to Condition (1) will cause the radius of curvature of the object side surface of the second lens to become too large, resulting in location of the rear principal point more on the object side. In either case, the principal point separation of the zoom lens group will become narrow, rendering it difficult to offer a sensible tradeoff between full length reductions and high zoom ratios. Keeping the shaping factor well in the range of Condition (1) is thus preferable because fluctuations of spherical aberrations and coma can be well corrected.

If Condition (1) is reduced down to the following Condition (1-1), it is then possible to achieve full length reductions while keeping more satisfactory performance.

$$-0.2 \leq (Ra1+Ra2)/(Ra1-Ra2) \leq 0.2 \quad (1-1)$$

Preferably, the second lens group should satisfy the following Condition (2):

$$0.2 \leq |f2|/\{(fw \cdot ft)^{1/2}\} \leq 1.0 \quad (2)$$

where f2 is the focal length of the second lens group, fw is the focal length of the optical system at the wide-angle end, and ft is the focal length of the optical system at the telephoto end.

Condition (2) is indicative of the focal length of the second lens group.

Generally, the stronger the refracting power of the second lens group, the smaller the amount of movement of the second lens group during zooming becomes, so that the full length of the optical system can be curtailed.

However, increasing refracting power will generally render correction of aberrations difficult.

Being short of the lower limit to Condition (2) is not preferable because spherical aberrations and coma become worse. Exceeding the upper limit to Condition (2) is again not preferable because there is an increase in the amount of movement of the second lens group during zooming.

If Condition (2) is reduced down to the following Condition (2-1), it is then possible to achieve full length reductions while keeping more satisfactory performance.

$$0.3 \leq |f2|/\{(fw \cdot ft)^{1/2}\} \leq 0.6 \quad (2-1)$$

Preferably, the third lens group should satisfy the following Condition (3):

$$0.2(R4a+R4b)/(R4a-R4b) \leq 5.0 \quad (3)$$

where R4a is the radius of curvature of the surface of the third lens group on the object side, and R4b is the radius of curvature of the surface of the third lens group on the image plane side.

Condition (3) is indicative of the shaping factor of a positive lens in the third lens group.

Exceeding the upper limit, or being short of the lower limit, to Condition (3) is not preferable because of a worsening of distortion and field curvature. Keeping the shaping factor well in the range of Condition (3) enables the positions of the principal points of the third lens group to shift on the image side while aberration fluctuations are kept in good conditions, making full length reductions possible.

If Condition (3) is reduced down to the following Condition (3-1), it is then possible to achieve full length reductions while keeping more satisfactory performance.

$$1.0 \leq (R4a+R4b)/(R4a-R4b) \leq 2.5 \quad (3-1)$$

Preferably, the second lens group should include two back-to-back lenses of negative refracting power.

If two back-to-back negative lenses are located in the zoom lens group, then the principal points spread wide upon seeing through the combined concave lenses and the front principal point of the zoom lens group can be located more on the object side.

Preferably, the second lens group should comprise at least four lenses: lenses having positive, positive, negative and negative refracting powers as viewed in order from the object side.

If the zoom lens group is built up of lenses having positive, positive, negative and negative refracting powers as viewed in order from the object side, it is then possible to locate the principal points of the zoom lens group on the most object side with a reduced number of lenses.

Preferably, the first lens group should remain fixed during zooming from the wide-angle end toward the telephoto end or upon imaging from imaging at infinity to close-range imaging.

As the full length remains fixed during zooming, it makes sure the strength of an associated lens barrel easily and simplifies the construction of the lens barrel, leading to size reductions.

In the imaging apparatus of the invention comprising an imaging device located on the image side of the zoom optical system and having an imaging plane capable of converting an optical image to electric signals, it is preferable that the zoom optical system is any one of the zoom optical systems as recited above.

More preferably, the requirements as recited above should be satisfied simultaneously in any desired combinations.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

The optical systems of Examples 1 and 2 are now explained.

Figure 1:
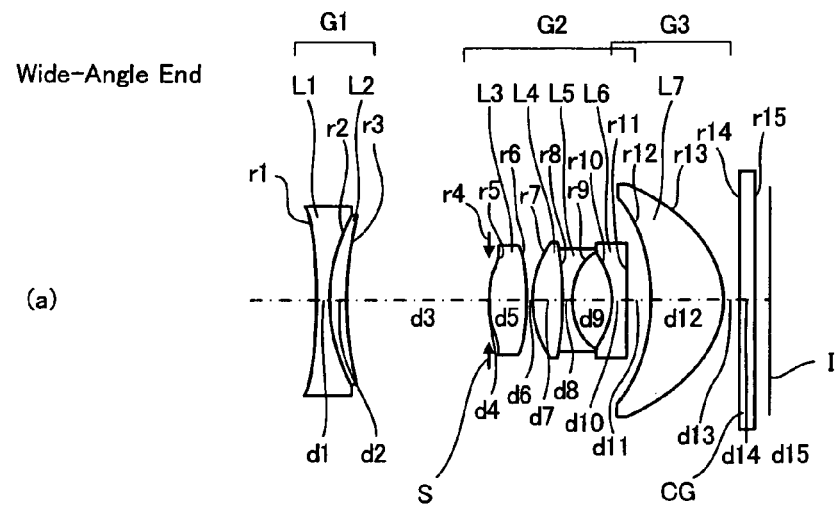
FIG. 1 is illustrative in section of the optical system according to Example 1.
Figure 1:
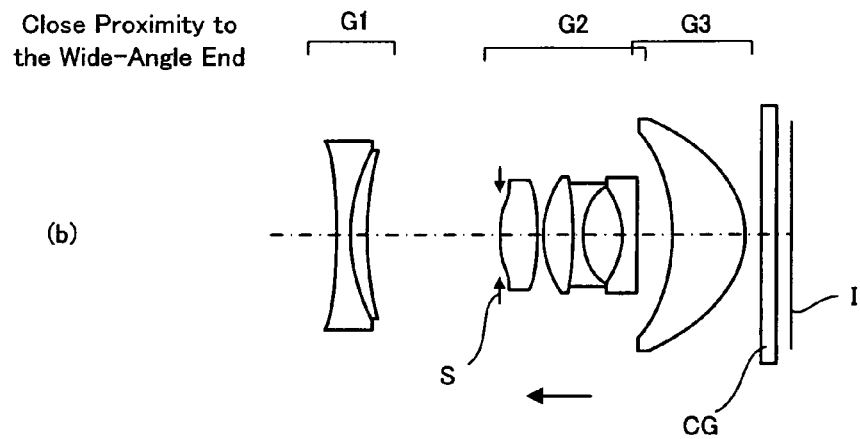
Figure 2:
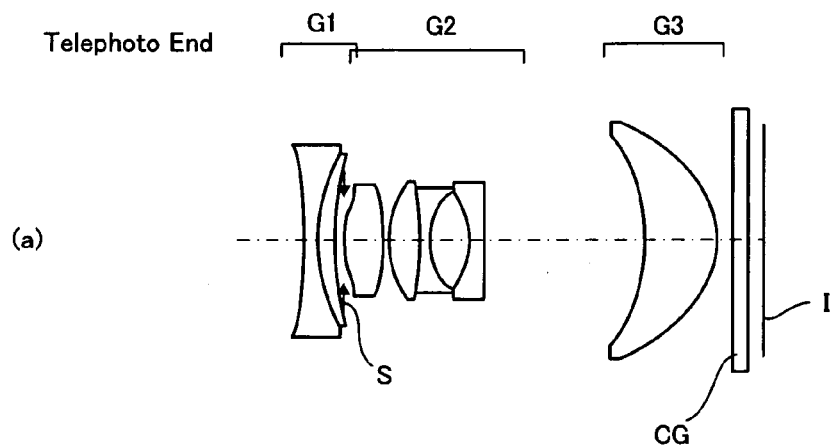
FIG. 2 is illustrative in section of the optical system according to Example 1.
Figure 2:
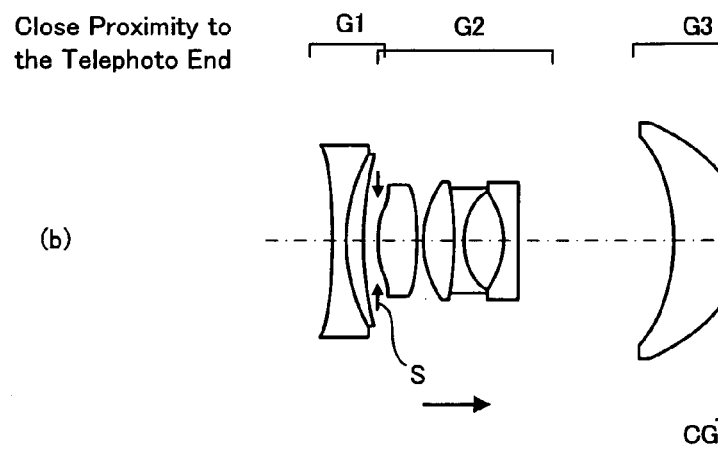

FIG. 1 is illustrative in section of the optical system of Example 1 at the wide-angle end and in close proximity to the wide-angle end, and FIG. 2 is illustrative in section of the optical system of Example 1 at the telephoto end and in close proximity to the telephoto end. More specifically, FIG. 1(a) is a sectional view of the optical system of Example 1 at the wide-angle end; FIG. 1(b) is a sectional view of the optical system of Example in close proximity to the wide-angle end; FIG. 2(a) is a sectional view of the optical system of Example 1 at the telephoto end; and FIG. 2(b) is a sectional view of the optical system of Example 1 in close proximity to the telephoto end.

As shown in FIGS. 1 and 2, the optical system of Example 1 includes, in order from the object side, a first lens group G1 of negative refracting power, a second lens group G2 of positive refracting power, and a third lens group G3 of positive refracting power.

The first lens group G1 is made up of a cemented lens in which a negative meniscus lens L1 convex on its objet side and a positive meniscus lens L2 convex on its object side are cemented together in order from the object side, and has a negative refracting power throughout. The first lens group G1 remains fixed during zooming.

The second lens group G2 is made up of, in order from the object side, a double-convex positive lens L3, a cemented lens in which a double-convex positive lens L4 and a double-concave negative lens L5 are cemented together, and a negative meniscus lens L6 concave on its object side, and has positive refracting power throughout.

The third lens group G3 is made up of one lens: a positive meniscus lens L7 concave on its object plane. The third lens group G3 remains fixed during zooming.

CG and I stand for a cover glass and an image plane, respectively.

From the wide-angle state shown in FIG. 1(a) to the telephoto end state shown in FIG. 2(a), the second lens group G2 moves to the object side. The zoom ratio from the wide-angle end to the telephoto end is 2.55, and the optical full length remains constant at 8.9 mm.

Upon image taking of a close-range object point at the wide-angle end, the second lens group G2 moves to the object side for focusing, as shown in FIG. 1(b).

Upon image taking of a close-range object point at the telephoto end, the second lens group G2 moves to the image side for focusing, as shown in FIG. 2(b).

Nine aspheric surfaces are used: one for the object-side surface of the negative meniscus lens L1 in the first lens group G1, one for the image-side surface of the positive meniscus lens L2 in the first lens group G1, two for both surfaces of the double-convex positive lens L3 located on the most object side of the second lens group G2, one for the image-side surface of the double-concave negative lens L5 in the second lens group G2, two for both surfaces of the negative meniscus lens L6 in the second lens group G2, and two for both surfaces of the positive meniscus lens L7 in the third lens group G3.

Figure 3:
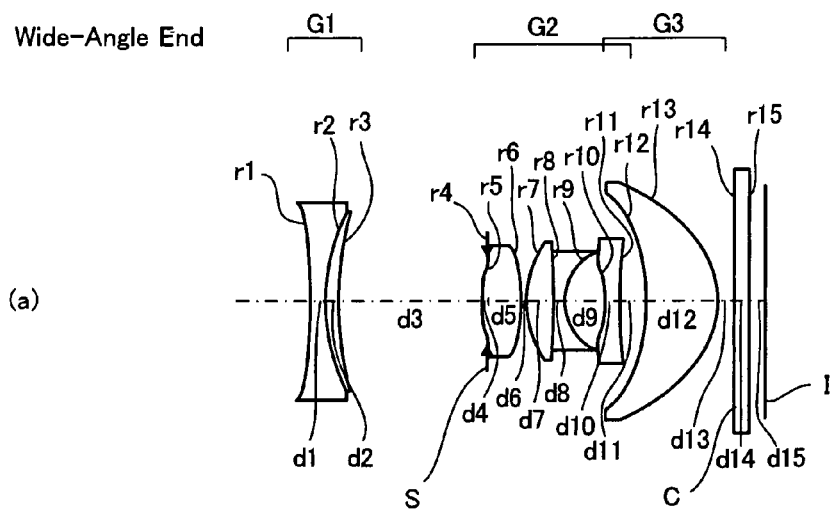
FIG. 3 is illustrative in section of the optical system according to Example 2.
Figure 3:
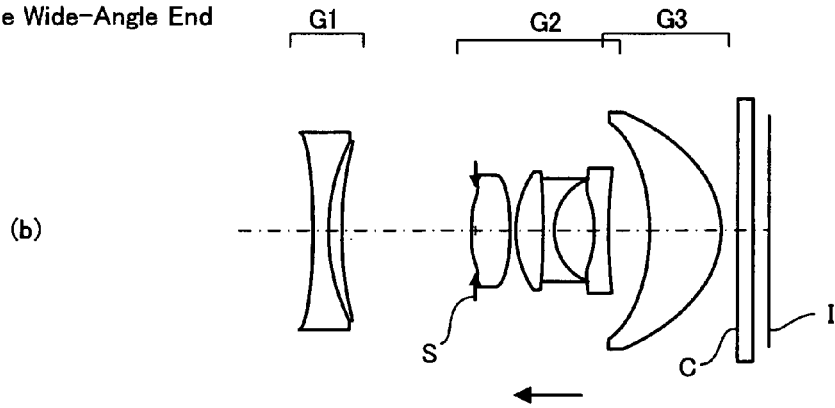
Figure 4:
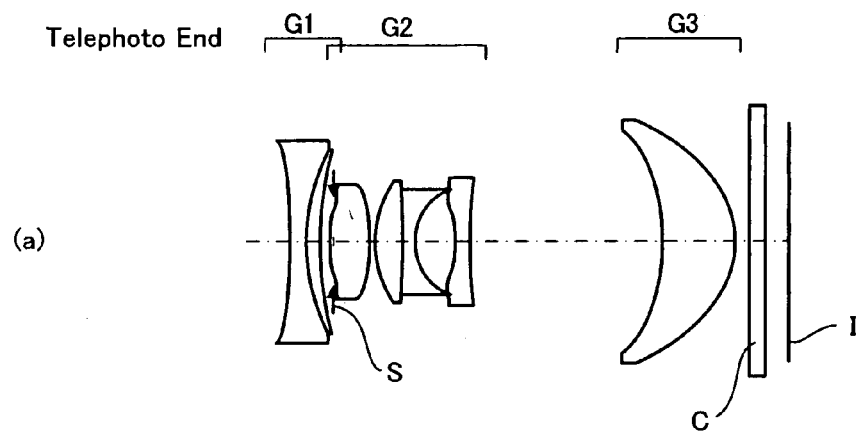
FIG. 4 is illustrative in section of the optical system according to Example 2.
Figure 4:
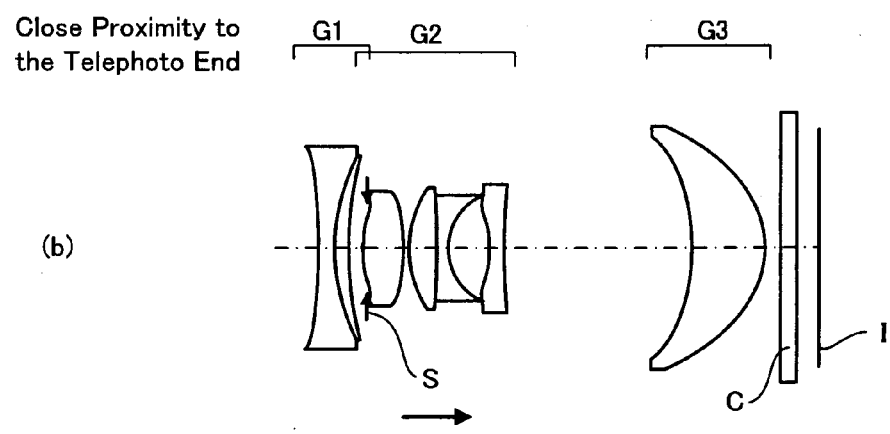
Figure 5:
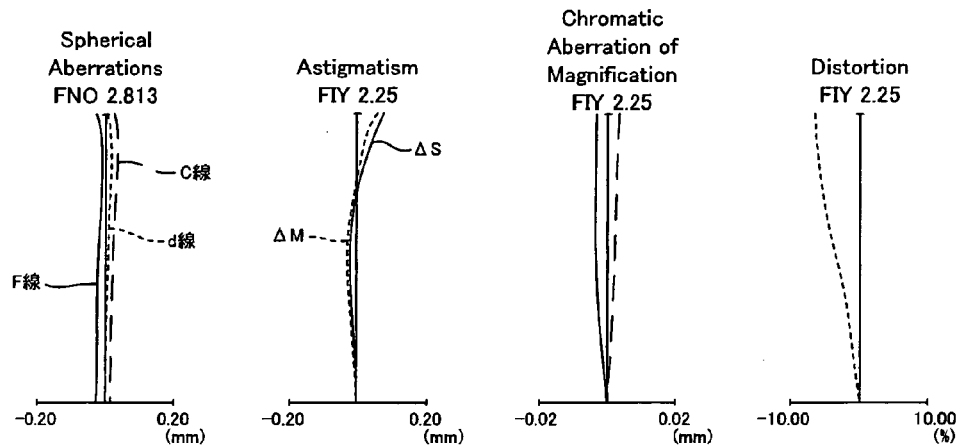
FIG. 5 is an aberration diagram for the optical system according to Example 1.
Figure 5:
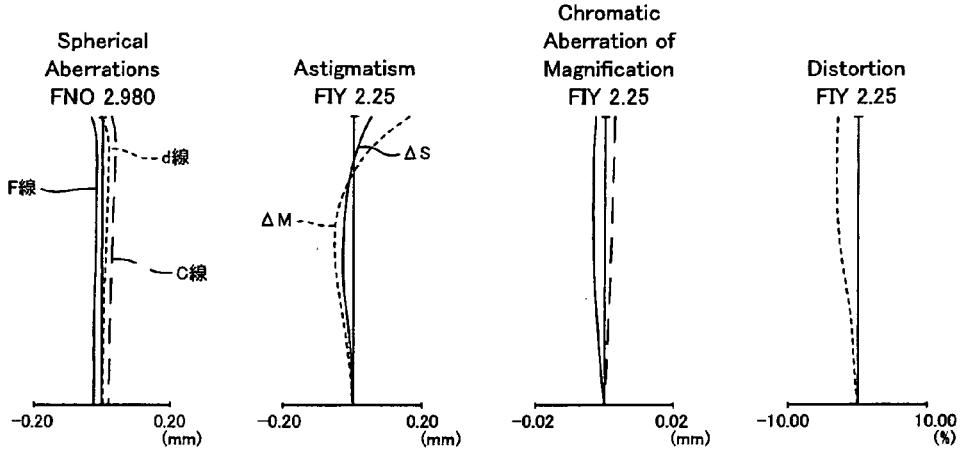
Figure 6:
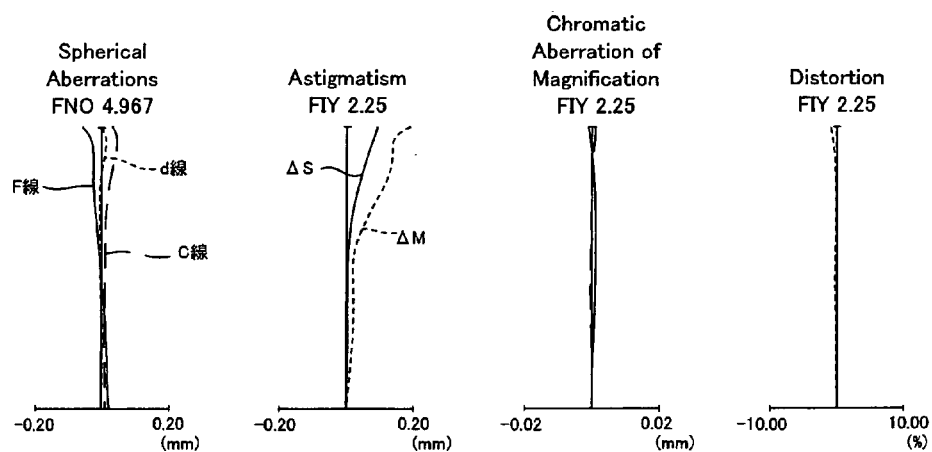
FIG. 6 is an aberration diagram for the optical system according to Example 1.
Figure 6:
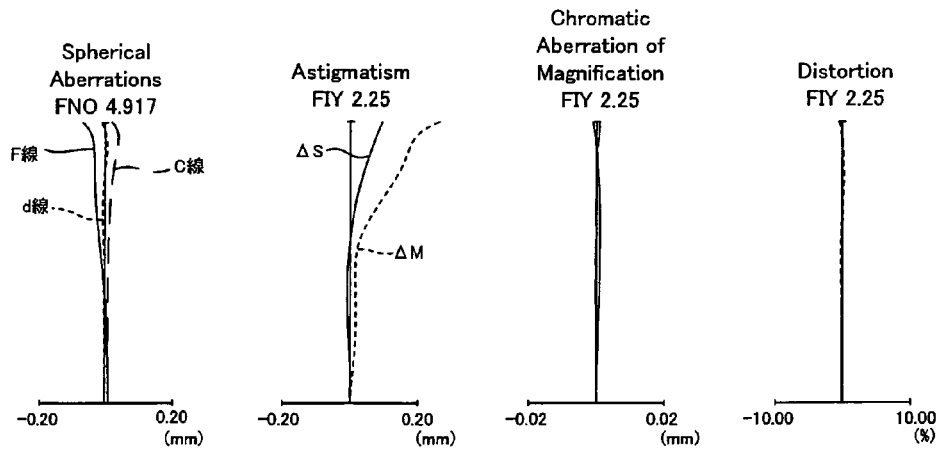
Figure 7:
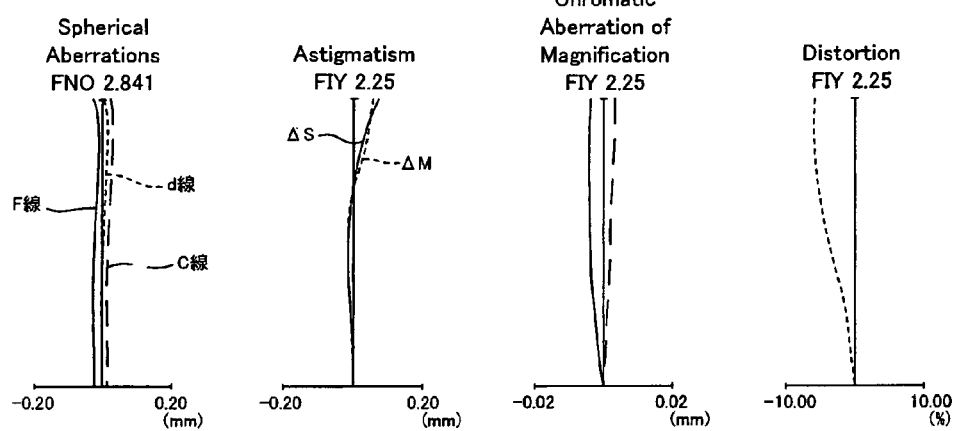
FIG. 7 is an aberration diagram for the optical system according to Example 2.
Figure 7:
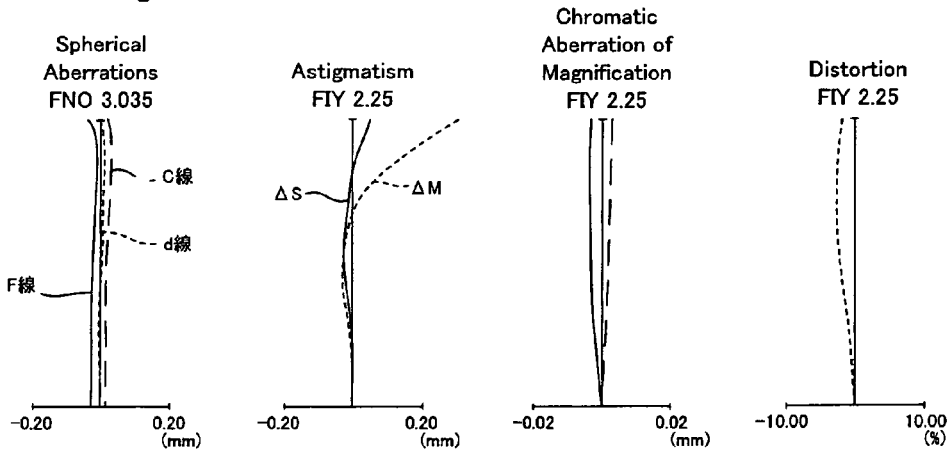
Figure 8:
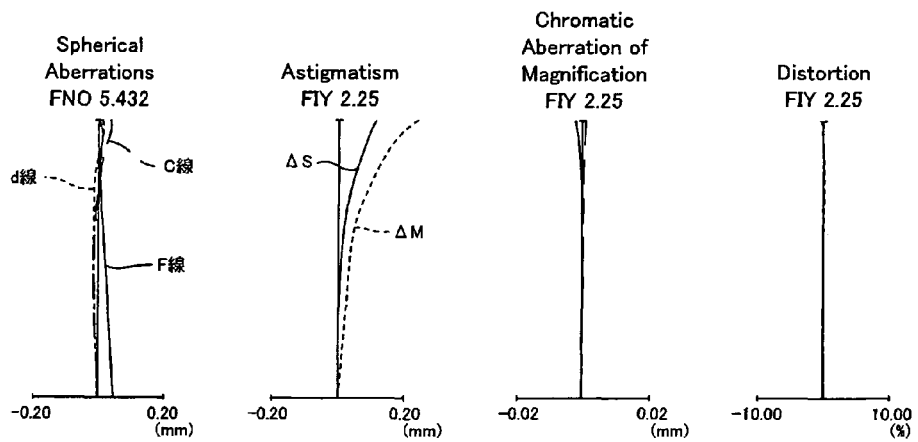
FIG. 8 is an aberration diagram for the optical system according to Example 2.
Figure 8:
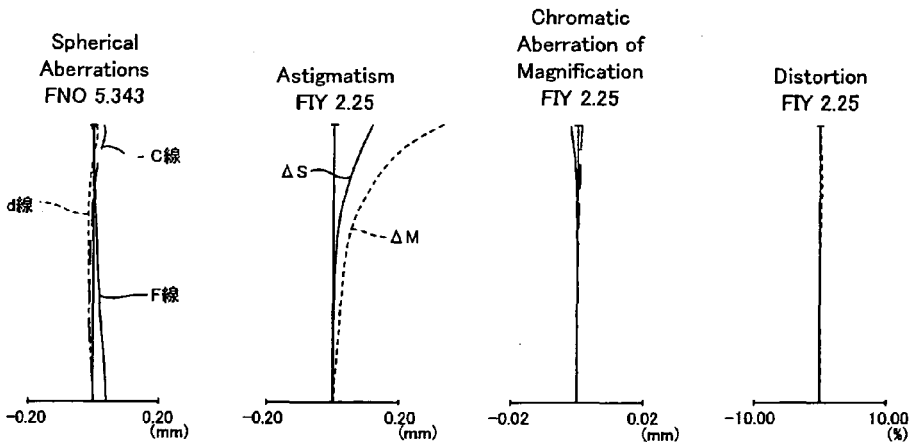

FIG. 3 is illustrative in section of the optical system of Example 2 at the wide-angle end and in close proximity to the wide-angle end, and FIG. 4 is illustrative in section of the optical system of Example 2 at the telephoto end and in close proximity to the telephoto end. More specifically, FIG. 3(a) is a sectional view of the optical system of Example 2 at the wide-angle end; FIG. 3(b) is a sectional view of the optical system of Example 2 in close proximity to the wide-angle end; FIG. 4(a) is a sectional view of the optical system of Example 2 at the telephoto end; and FIG. 4(b) is a sectional view of the optical system of Example 2 in close proximity to the telephoto end.

As shown in FIGS. 3 and 4, the optical system of Example 2 includes, in order from the object side, a first lens group G1 of negative refracting power, a second lens group G2 of positive refracting power and a third lens group G3 of positive refracting power.

The first lens group G1 is made up of a cemented lens in which a negative meniscus lens L1 convex on its object side and a positive meniscus lens L2 convex on its object side are cemented together in order from the object side, and has negative refracting power throughout.

The second lens group G2 is made up of, in order from the object side, a double-convex positive lens L3, a cemented lens in which a double-convex positive lens L4 and a double-concave negative lens L5 are cemented together, and a negative meniscus lens L6 concave on its object side, and has positive refracting power throughout.

The third lens group G3 is made up of one lens: a positive meniscus lens L7 concave on its object side. The third lens group G3 remains fixed during zooming.

CG and I stand for a cover glass and an image plane, respectively.

From the wide-angle end state shown in FIG. 3(a) to the telephoto end state shown in FIG. 4(a), the first lens group G1 moves to the object side, and the second lens group G2 moves to the object side. The cover glass CG moves to the object side, too. The zoom ratio from the wide-angle end to the telephoto end is 2.8.

Upon image-taking of a close-range object point at the wide-angle end, the second lens group G2 moves to the object side for focusing, as shown in FIG. 3(b).

Upon image taking of a close-range object point at the telephoto end, the second lens group G2 moves to the image side for focusing, as shown in FIG. 4(b).

Nine aspheric surfaces are used: one for the object-side surface of the negative meniscus lens L1 in the first lens group L1, one for the image-side surface of the positive meniscus lens L2 in the first lens group G1, two for both surfaces of the double-convex positive lens L3 located on the most object side of the second lens group G2, one for the image-side surface of the double-concave negative lens L5 in the second lens group G2, two for both surfaces of the negative meniscus lens L6 in the second lens group G2, and two for both surfaces of the positive meniscus lens L7 in the third lens group G3.

Numeral data on Examples 1 and 2 are given below. In these numeral data, r is the radius of curvature of each lens surface, d is a lens thickness and an air separation, Nd and νd are d-line (λ=587.6 nm) refractive index and Abbe constant, and ER is an effective diameter. Fno and ω are an F-number and a half angle of view (°), respectively.

In the following specifications for Numeral Examples 1 and 2, the surfaces followed by (Aspheric Surface) are the ones of aspheric shape. Aspheric surface shape is represented by the following formula (9):

$$X(H) = (H^2/r)/\{1 + [1 - (1+K) \cdot (H^2/r^2)]^{1/2}\} + A4H^4 + A6H^6 + A8H^8 + A10H^{10} + A12H^{12}$$

where H is a height vertical to an optical axis, X(H) is an amount of displacement at height H in the optical axis direction provided that the origin is defined by a vertex, r is the paraxial radius of curvature, K is the conic constant, and A2, A4, A6, A8, A10 and A12 are the $2^{nd}$-, $4^{th}$-, $6^{th}$-, $8^{th}$-, $10^{th}$- and $12^{th}$-order aspheric coefficients.

Numeral Example 1

Unit mm

Surface Data

| Surface No. | r | d | nd | νd | ER |
|---|---|---|---|---|---|
| 1 (Aspheric Surface) | 284.077 | 0.30 | 1.69350 | 53.20 | 1.81 |
| 2 | 3.822 | 0.28 | 1.63387 | 23.38 | 1.61 |
| 3 (Aspheric Surface) | 3.814 | D3 | 1.00000 | | 1.58 |
| 4 (Stop) | ∞ | 0.00 | 1.00000 | | 1.58 |
| 5 (Aspheric Surface) | 2.077 | 0.76 | 1.59201 | 67.02 | 0.95 |
| 6 (Aspheric Surface) | −24.100 | 0.10 | 1.00000 | | 1.04 |
| 7 | 2.224 | 0.56 | 1.83400 | 37.16 | 1.05 |
| 8 | −9.331 | 0.21 | 1.61000 | 25.60 | 1.00 |
| 9 (Aspheric Surface) | 1.619 | D9 | 1.00000 | | 0.90 |
| 10 (Aspheric Surface) | −2.350 | 0.27 | 1.54454 | 55.90 | 0.88 |
| 11 (Aspheric Surface) | −17868.043 | D11 | 1.00000 | | 1.05 |
| 12 (Aspheric Surface) | −5.803 | 1.42 | 1.54454 | 55.90 | 2.00 |
| 13 (Aspheric Surface) | −1.777 | D13 | 1.00000 | | 2.22 |
| 14 | ∞ | 0.30 | 1.51633 | 64.14 | 2.50 |
| 15 | ∞ | D15 | 1.00000 | | 2.50 |
| Image Plane | ∞ | | | | |

-continued

Aspheric Data

1st Surface

K = −1.000,
A4 = −3.27261E−02, A6 = 7.59290E−03, A8 = −4.42538E−04, A10 = −6.84510E−05

3rd Surface

K = −1.000,
A4 = −4.03320E−02, A6 = 1.10490E−02, A8 = −3.36010E−04, A10 = −3.26020E−04

5th Surface

K = 0.000,
A4 = −2.68318E−02, A6 = −2.49567E−02, A8 = 7.31686E−03, A10 = −1.52062E−02

6th Surface

K = 0.000,
A4 = −4.27094E−02, A6 = −2.02273E−02, A8 = 1.03398E−03, A10 = −7.25287E−03

9th Surface

K = 0.000,
A4 = 7.35129E−02, A6 = 8.47754E−04, A8 = 7.68574E−02

10th Surface

K = 0.000,
A4 = −1.44219E−01, A6 = 8.68545E−03, A8 = 1.08777E−01, A10 = −1.08300E−01

11th Surface

K = −1.000,
A4 = −6.99290E−02, A6 = 8.61586E−02, A8 = −1.22815E−02, A10 = −6.73050E−03

12th Surface

K = 0.000,
A4 = −2.97803E−02, A6 = 9.93186E−03, A8 = −1.40598E−03, A10 = −4.49689E−07

13th Surface

K = −0.491,
A4 = 5.60354E−03, A6 = 1.33571E−03, A8 = 3.98382E−04, A10 = −7.33348E−05

Zoom Data

Zoom Ratio    2.55

|  | Wide-Angle End | Close Proximity to the Wide-Angle End | Telephoto End | Close Proximity to the Telephoto End |
|---|---|---|---|---|
| Focal Length | 3.12 | 3.40 | 7.96 | 7.74 |
| Fno | 2.81 | 2.98 | 4.97 | 4.92 |
| Angle of View (2 ω) | 75.33 | 68.32 | 31.85 | 32.74 |
| Image Height | 2.25 | 2.25 | 2.25 | 2.25 |
| Full Lens Length | 8.90 | 8.90 | 8.90 | 8.90 |
| BF | 0.90 | 0.90 | 0.90 | 0.90 |
| Entrance Pupil | 2.22 | 2.11 | 0.54 | 0.64 |

Postition

Exit Pupil Position A (Exit Pupil Position from the Last Lens Surface)

| −10.39 | −14.16 | 16.52 | 17.42 |
|---|---|---|---|

Exit Pupil Position B (Exit Pupil Position from the Image Plane)

| −11.19 | −14.96 | 15.72 | 16.62 |
|---|---|---|---|

Front Principal Point Position

| 4.47 | 4.74 | 12.53 | 11.96 |
|---|---|---|---|

Rear Principal Point Position

|  | | | | |
|---|---|---|---|---|
|  | −2.82 | −3.21 | −7.65 | −7.56 |
| D3 | 2.83 | 2.60 | 0.20 | 0.30 |
| D9 | 0.78 | 0.78 | 0.78 | 0.78 |
| D11 | 0.48 | 0.72 | 3.12 | 3.01 |
| D13 | 0.30 | 0.30 | 0.30 | 0.30 |
| D15 | 0.30 | 0.30 | 0.30 | 0.30 |

-continued

Individual Lens Data

| Lens | Starting Surface | Focal Length |
| --- | --- | --- |
| L1 | 1 | −5.59 |
| L2 | 2 | 227.80 |
| L3 | 5 | 3.27 |
| L4 | 7 | 2.20 |
| L5 | 8 | −2.25 |
| L6 | 10 | −4.32 |
| L7 | 12 | 4.18 |

Zoom Lens Group Data

| Group | Starting Surface | Focal Length | Lens Arragement Length |
| --- | --- | --- | --- |
| G1 | 1 | −5.5661 | 0.5800 |
| G2 | 4 | 2.3649 | 1.6274 |
| G3 | 10 | −4.3153 | 0.2726 |
| G4 | 12 | 4.1830 | 2.0245 |

| Group | Front Principal Point Position | Rear Principal Point Position |
| --- | --- | --- |
| G1 | 0.3382 | −0.0101 |
| G2 | −0.2279 | −1.0366 |
| G3 | −0.0000 | −0.1765 |
| G4 | 1.1820 | −0.1358 |

| Group | Wide-Angle Magnification | Intermediate Magnification | Telephoto Magnification |
| --- | --- | --- | --- |
| G1 | 0.0000 | 0.0000 | 0.0526 |
| G2 | −0.4065 | −0.7426 | −0.4472 |
| G3 | 1.5404 | 2.1504 | 1.5951 |
| G4 | 0.8952 | 0.8951 | 0.8952 |

Numeral Example 2

Unit mm

Surface Data

| Surface No. | r | d | nd | vd | ER |
| --- | --- | --- | --- | --- | --- |
| 1 (Aspheric Surface) | 275.896 | 0.30 | 1.69350 | 53.20 | 1.83 |
| 2 | 3.904 | 0.28 | 1.63387 | 23.38 | 1.64 |
| 3 (Aspheric Surface) | 3.625 | D3 | 1.00000 | | 1.61 |
| 4 (Stop) | ∞ | −0.10 | 1.00000 | | 0.85 |
| 5 (Aspheric Surface) | 2.082 | 0.77 | 1.59201 | 67.02 | 0.88 |
| 6 (Aspheric Surface) | −24.177 | 0.10 | 1.00000 | | 0.98 |
| 7 | 2.237 | 0.56 | 1.83400 | 37.16 | 1.00 |
| 8 | −9.389 | 0.21 | 1.61000 | 25.60 | 0.94 |
| 9 (Aspheric Surface) | 1.627 | D9 | 1.00000 | | 0.90 |
| 10 (Aspheric Surface) | −2.333 | 0.27 | 1.54454 | 55.90 | 0.94 |
| 11 (Aspheric Surface) | −13612.925 | D11 | 1.00000 | | 1.09 |
| 12 (Aspheric Surface) | −6.222 | 1.42 | 1.54454 | 55.90 | 2.00 |
| 13 (Aspheric Surface) | −1.750 | D13 | 1.00000 | | 2.22 |
| 14 | ∞ | 0.30 | 1.51633 | 64.14 | 2.50 |
| 15 | ∞ | D15 | 1.00000 | | 2.50 |
| Image Plane | ∞ | | | | |

Aspheric Data $1^{st}$ Surface $K = -1.000$,
$A4 = -3.61788E-02$, $A6 = 9.84129E-03$, $A8 = -9.01148E-04$, $A10 = -4.87278E-05$ $3^{rd}$ Surface $K = -1.000$,
$A4 = -4.39300E-02$, $A6 = 1.27250E-02$, $A8 = -9.19580E-05$, $A10 = -5.33170E-04$ -continued 5$^{th}$ Surface K = 0.000,
A4 = −3.42899E−02, A6 = −4.60442E−02, A8 = 2.41371E−02, A10 = −3.36031E−02

6$^{th}$ Surface

K = 0.000,
A4 = −7.20113E−02, A6 = −2.65029E−02, A8 = −1.13623E−03, A10 = −5.51827E−03

9$^{th}$ Surface

K = 0.000,
A4 = 1.34179E−01, A6 = 2.12632E−02, A8 = 1.91144E−01

10$^{th}$ Surface

K = 0.000,
A4 = −7.40533E−02, A6 = 7.78628E−02, A8 = 1.07051E−01, A10 = −5.08971E−02

11$^{th}$ Surface

K = −1.000,
A4 = −3.31306E−02, A6 = 8.65468E−02, A8 = 8.12362E−04, A10 = −1.95356E−02

12$^{th}$ Surface

K = 0.000,
A4 = −2.56061E−02, A6 = 6.27279E−03, A8 = −9.11807E−04, A10 = 3.62897E−06

13$^{th}$ Surface

K = −0.515,
A4 = 9.31569E−03, A6 = 8.69481E−04, A8 = 3.44678E−05, A10 = −1.09508E−05

| Zoom Data | | | | |
|---|---|---|---|---|
| Zoom Ratio | 2.77 | | | |
| | Wide-Angle End | Close Proximity to the Wide-Angle End | Telephoto End | Close Proximity to the Telephoto End |
| Focal Length | 3.10 | 3.43 | 8.57 | 8.47 |
| Fno | 2.84 | 3.04 | 5.43 | 5.43 |
| Angle of View(2 ω) | 75.28 | 67.39 | 29.48 | 30.10 |
| Image Height | 2.25 | 2.25 | 2.25 | 2.25 |
| Full Lens Length | 9.01 | 9.01 | 9.66 | 9.66 |
| BF | 0.92 | 0.92 | 1.04 | 1.04 |
| Entrance Pupil | 2.25 | 2.13 | 0.63 | 0.70 |

| Position | | | | |
|---|---|---|---|---|
| Exit Pupil Position A (Exit Pupil Position from the Last Lens Surface) | | | | |
| | −11.23 | −16.89 | 11.82 | 12.10 |
| Exit Pupil Position B (Exit Pupil Position from the Image Plane) | | | | |
| | −12.05 | −17.71 | 10.89 | 11.17 |
| Front Principal Point Position | | | | |
| | 4.55 | 4.89 | 15.95 | 15.50 |
| Rear Principal Point Position | | | | |
| | −2.77 | −3.22 | −8.13 | −8.17 |
| D3 | 2.96 | 2.69 | 0.30 | 0.38 |
| D9 | 0.80 | 0.80 | 0.80 | 0.80 |
| D11 | 0.51 | 0.79 | 3.71 | 3.63 |
| D13 | 0.30 | 0.30 | 0.30 | 0.30 |
| D15 | 0.32 | 0.32 | 0.44 | 0.44 |

| Individual Lens Data | | |
|---|---|---|
| Lens | Starting Surface | Focal Length |
| L1 | 1 | −5.71 |
| L2 | 2 | −131.48 |
| L3 | 5 | 3.27 |
| L4 | 7 | 2.21 |
| L5 | 8 | −2.26 |
| L6 | 10 | −4.29 |
| L7 | 12 | 4.02 |

-continued

Zoom Lens Group Data

| Group | Starting Surface | Focal Length | Lens Arragement Length |
|---|---|---|---|
| G1 | 1 | −5.3218 | 0.5800 |
| G2 | 4 | 2.3761 | 1.5412 |
| G3 | 10 | −4.2857 | 0.2726 |
| G4 | 12 | 4.0193 | 2.0223 |

| Group | Front Principal Point Position | Rear Principal Point Position |
|---|---|---|
| G1 | 0.3391 | −0.0093 |
| G2 | −0.3259 | −1.0430 |
| G3 | −0.0000 | −0.1765 |
| G4 | 1.1519 | −0.1740 |

| Group | Wide-Angle Magnification | Intermediate Magnification | Telephoto Magnification |
|---|---|---|---|
| G1 | 0.0000 | 0.0000 | 0.0504 |
| G2 | −0.4249 | −0.8112 | −0.4707 |
| G3 | 1.5608 | 2.3444 | 1.6253 |
| G4 | 0.8769 | 0.8470 | 0.8769 |

FIGS. 5 to 8 are aberration diagrams for Examples 1 and 2 upon focusing at infinity. More specifically, FIG. 5(a) is an aberration diagram for Example 1 at the wide-angle end; FIG. 5(b) is an aberration diagram for Example 1 in close proximity to the wide-angle end; FIG. 6(a) is an aberration diagram for Example 1 at the telephoto end; FIG. 6(b) is an aberration diagram for Example 1 in close proximity to the telephoto end; FIG. 7(a) is an aberration diagram for Example 2 at the wide-angle end; FIG. 7(b) is an aberration diagram for Example 2 in close proximity to the wide-angle end; FIG. 8(a) is an aberration diagram for Example 2 at the telephoto end; and FIG. 8(b) is an aberration diagram for Example 2 in close proximity to the telephoto end.

Spherical aberration and chromatic aberration of magnification are indicated by numerals at the respective wavelengths: 486.1 nm (F-line: one-dotted line), 587.6 nm (d-line: broken line), and 656.3 nm (C-line: solid line). Astigmatism is provided with the sagittal image surface as a solid line and the meridional image surface as a dotted line, and FNO and FIY are indicative of an F-number and an image height, respectively.

Set out below are the values of Conditions (1), (2) and (3) in Examples 1 and 2.

| Conditions | Example 1 | Example 2 |
|---|---|---|
| (1) | −0.18 | −0.18 |
| (2) | 0.47 | 0.67 |
| (3) | 1.88 | 1.78 |

With the inventive zoom optical system as embodied above, it is possible to offer a sensible tradeoff between size reductions in the full lens length direction and high zoom ratios. It is also possible to achieve cost reductions because the necessary power is kept so low that the lenses can be made thin and low refractive index vitreous material can be used, resulting in size reductions. Sensitivity to decentration can remain low too. Moreover, it is possible to provide an imaging apparatus incorporating such a zoom optical system.

Such an imaging apparatus as mentioned above may be used with image-taking apparatus designed to form an object image through a zoom optical system and receive that image at a CCD or other imaging device, inter alia, digital cameras, video cameras, personal computers typical of information processors, and phones, especially convenient-to-carry-around cellular phones, as embodied below.

Figure 9:
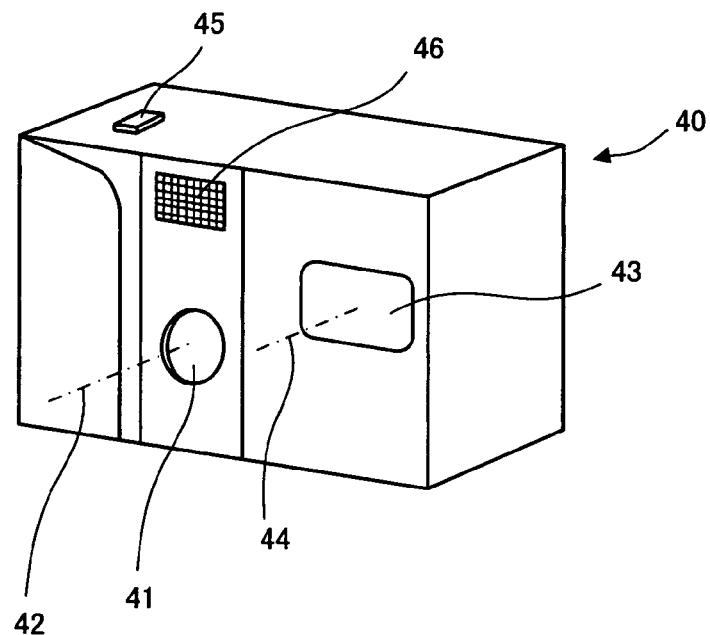
FIG. 9 is a front perspective view illustrative of the outside shape of a digital camera.
Figure 10:
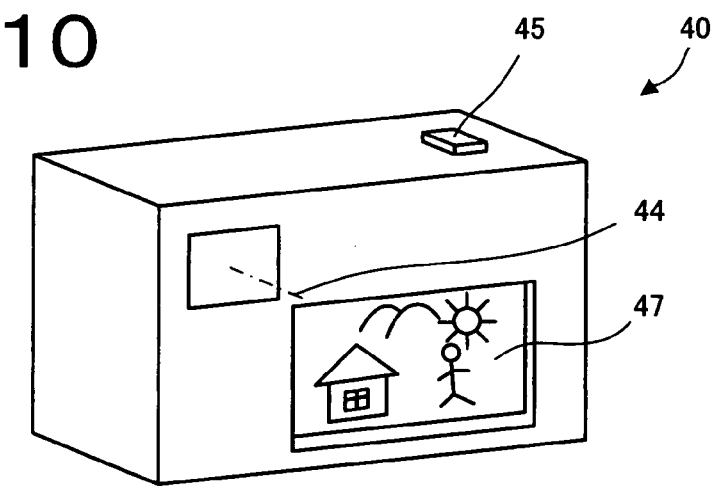
FIG. 10 is a rear perspective view illustrative of the outside shape of the digital camera.
Figure 11:
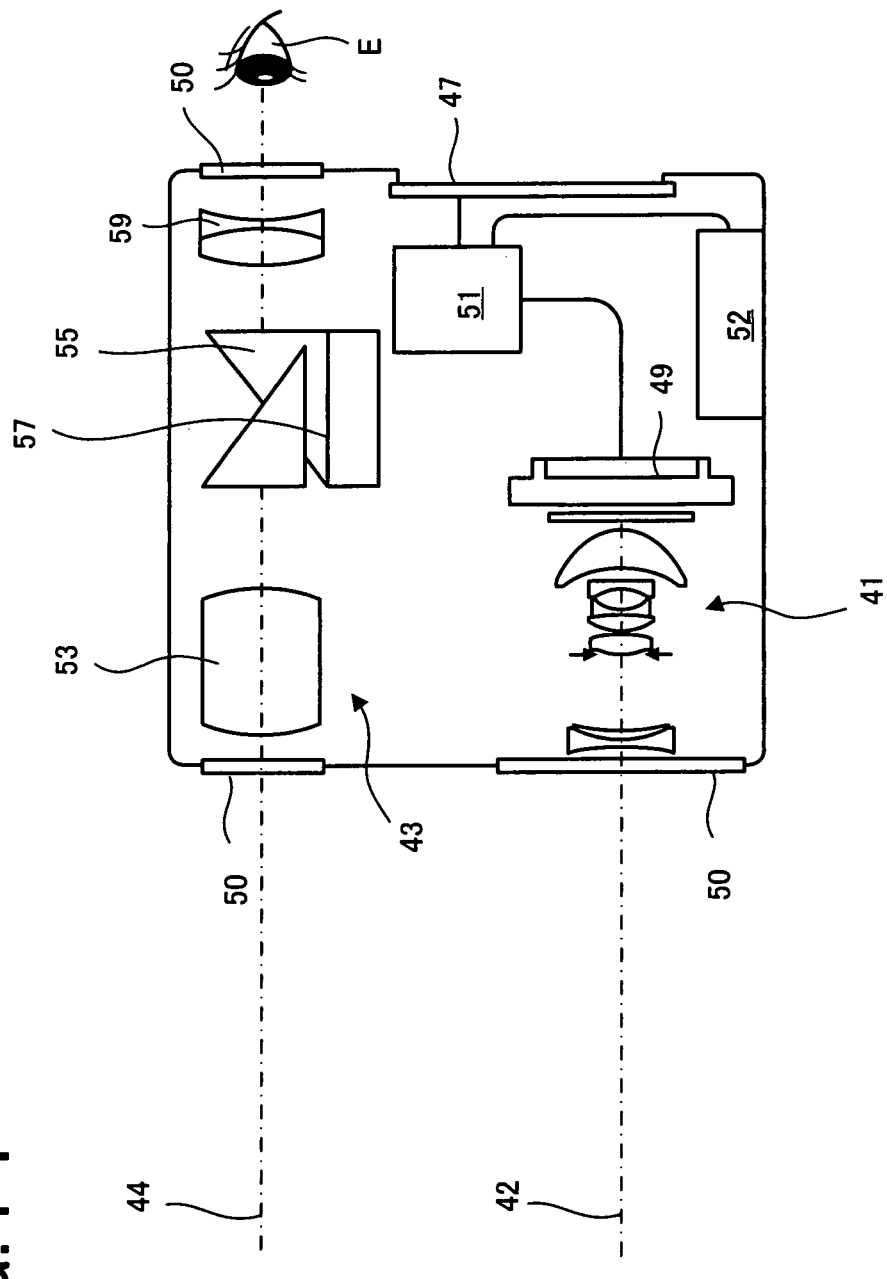
FIG. 11 is a sectional view illustrative of the construction of the digital camera.

FIGS. 9 to 11 are illustrative in conception of an arrangement having the zoom optical system built in an image-taking optical system 41 of a digital camera. More specifically, FIG. 9 is a front perspective view of the outside shape of a digital camera 40; FIG. 10 is a rear perspective view of the same; and FIG. 11 is a sectional view of the arrangement of the digital camera 40. The digital camera 40 here includes an image-taking optical system 41 having an image-taking optical path 42, a finder optical system 43 having a finder optical path 44, a shutter 45, a flash 46, a liquid crystal display monitor 47, and so on. As the shutter 45 located on top of the camera 40 is pressed down, it causes an image to be taken through the image-taking optical system 41, for instance, the zoom optical system of Example 1. An object image taken by the image-taking optical system 41 is then formed on the imaging plane of CCD 49 through a cover glass CG having a near-infrared cut coating functioning as a low-pass filter. The object image received at CCD 49 is then displayed via a processing means 51 on the liquid crystal display monitor 47 mounted on the back of the camera. The processing means 51 is also connected with a recording means 52 so as to record the taken electronic image in it. It is to be noted that the recording means 52 may be provided separately from the processing means 51 or, alternatively, the electronic image may be recorded and written in a recording medium such as a memory card or MO. If a silver halide film is located in place of CCD 49, the digital camera may be constructed in the form of a silver halide camera.

Further, a finder objective optical system 53 is located on the finder optical path 44. An object image formed by the finder objective optical system 53 is formed on the field frame 57 of an image-erecting Porro prism 55. In the rear of the Porro prism 55, there is an eyepiece optical system 59 located so as to guide an erected orthoscopic image to a viewers eyeball E. It is to be noted that a cover member 50 is located on the entrance side of the image-taking optical system 41, and the finder objective optical system 53 as well as on the exit side of the eyepiece optical system 59.

The thus assembled digital camera 40 can have higher performance and smaller size because the image-taking optical system 41 has high performance and small-format size.

Although a plane-parallel plate is located as the cover member 50 in the example of FIG. 11, it is to be understood that any powered lens may be used.

Figure 12:
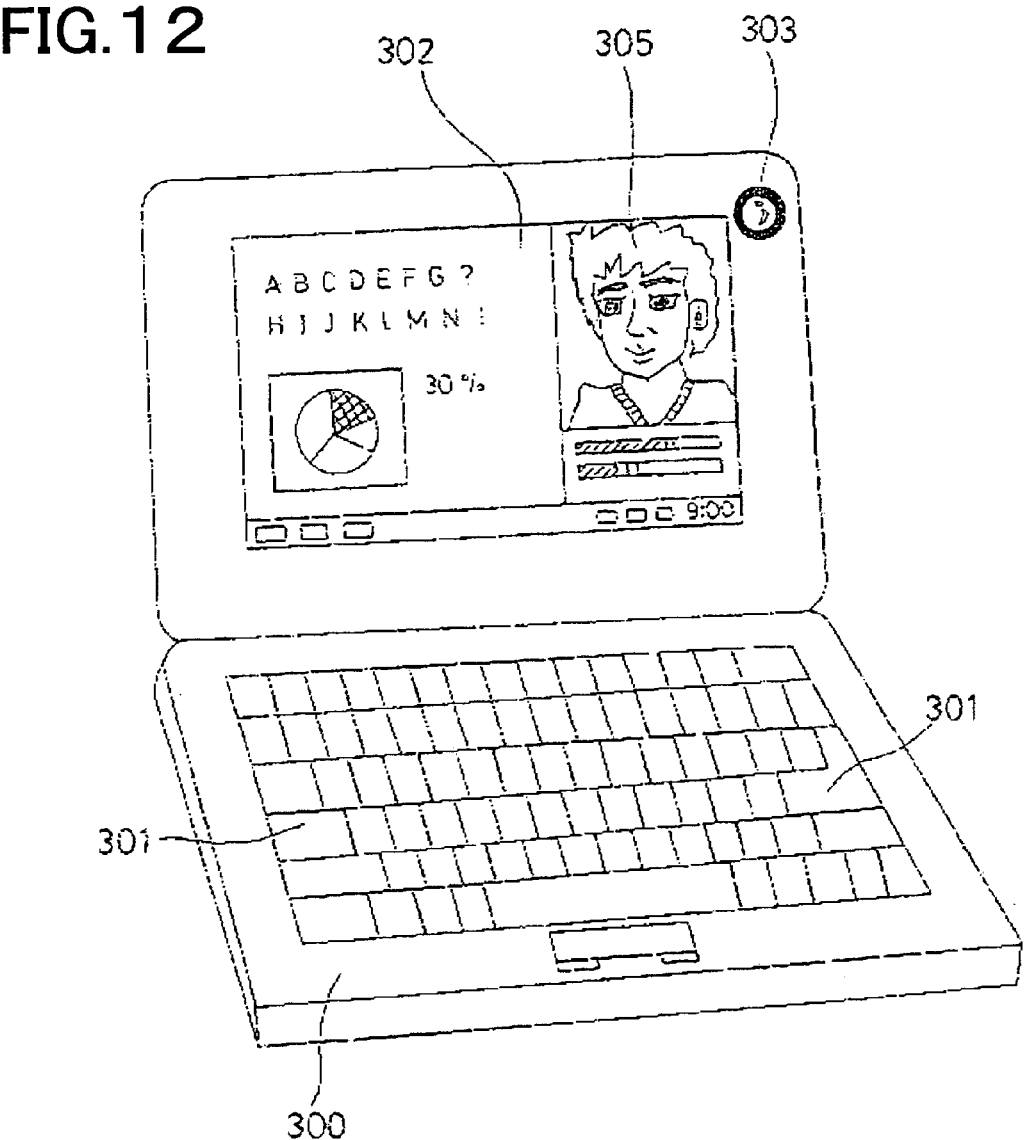
FIG. 12 is a front perspective view illustrative of a personal computer with its cover shut open.
Figure 13:
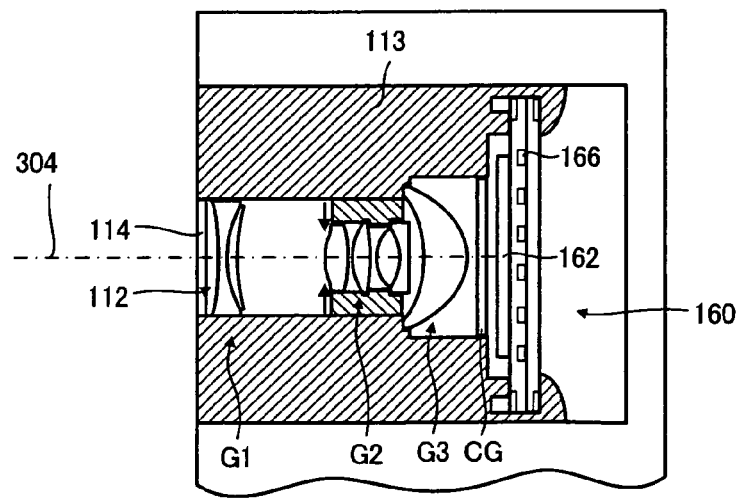
FIG. 13 is a sectional view of an image-taking optical system in the personal computer.
Figure 14:
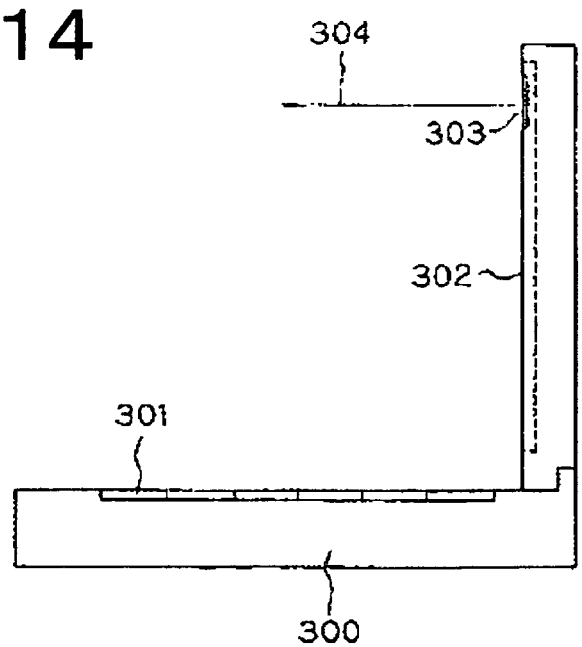
FIG. 14 is a side view of the state of FIG. 12.

Referring then to FIGS. 12 to 14, there is a personal computer shown that is one typical example of an information processor having a zoom optical system built in as an objective optical system. More specifically, FIG. 12 is a front perspective view of a personal computer 300 with its cover shut open; FIG. 13 is a sectional view of an image-taking optical system 303 in the personal computer 300; and FIG. 14 is a side view of the state of FIG. 12. As shown in FIGS. 12, 13 and 14, the personal computer 300 includes a keyboard 301 via which an operator enters information from outside, an information processing means and recording means (not shown), a monitor 302 for showing information to the operator, and an image-taking optical system 303 for taking an operators own image and the surrounding images. For the monitor 302 here, use may be made of a transmission type liquid crystal display designed to implement illumination from back by a backlight (not shown), a reflection type liquid crystal display designed to reflect light from front to display images, or the like. While the image-taking optical system 303 is shown to be built in the right upper portion of the monitor 302, it is to be understood that it may be located anywhere, for instance, around the monitor 302 or around the keyboard 301.

The image-taking optical system 303 includes, on an image-taking optical path 304, an objective lens 112 comprising a (roughly shown) zoom optical system and an imaging device chip 162 for receiving an image, each built in the personal computer 300.

Here a cover glass CG functioning as a low-pass filter is additionally applied onto the imaging device chip 162 to form an integrated-form imaging unit 160, and the imaging unit 160 is detachably fitted over the rear end of the lens barrel 113 of the objective lens 112 in one-touch operation; so any centering alignment or surface separation adjustment of the objective lens 112 and imaging device chip 162 may be dispensed with, resulting in simplified assembling. The lens barrel 113 is provided at its end with a cover glass 114 for protection of the objective lens 112.

An object image received at the imaging device chip 162 is then entered into the processing means of the personal computer 300 via a terminal 166 so that it is displayed on the monitor 302 as an electronic image. An image 305 taken of the operator is shown typically in FIG. 12. The image 305 may be remotely displayed on a personal computer at other communication end through the processing means via the Internet or a phone line.

Figure 15:
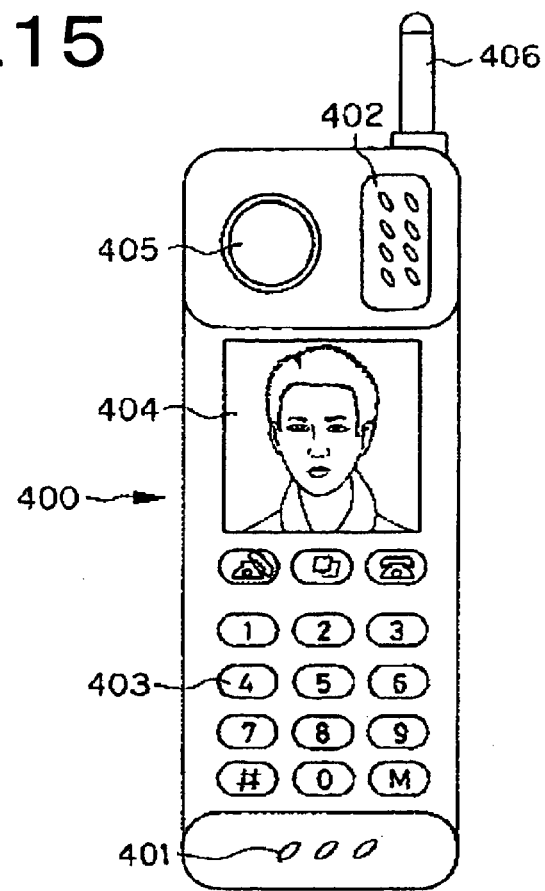
FIG. 15 is a front view of a cellular phone.
Figure 16:
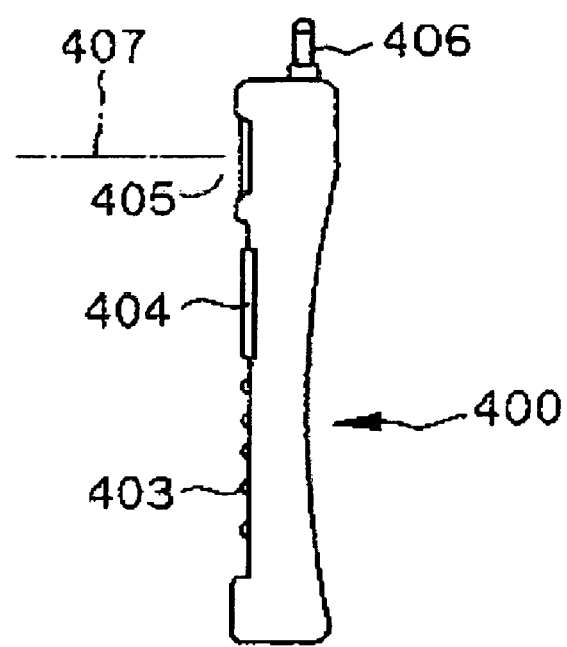
FIG. 16 is a side view of the cellular phone.
Figure 17:
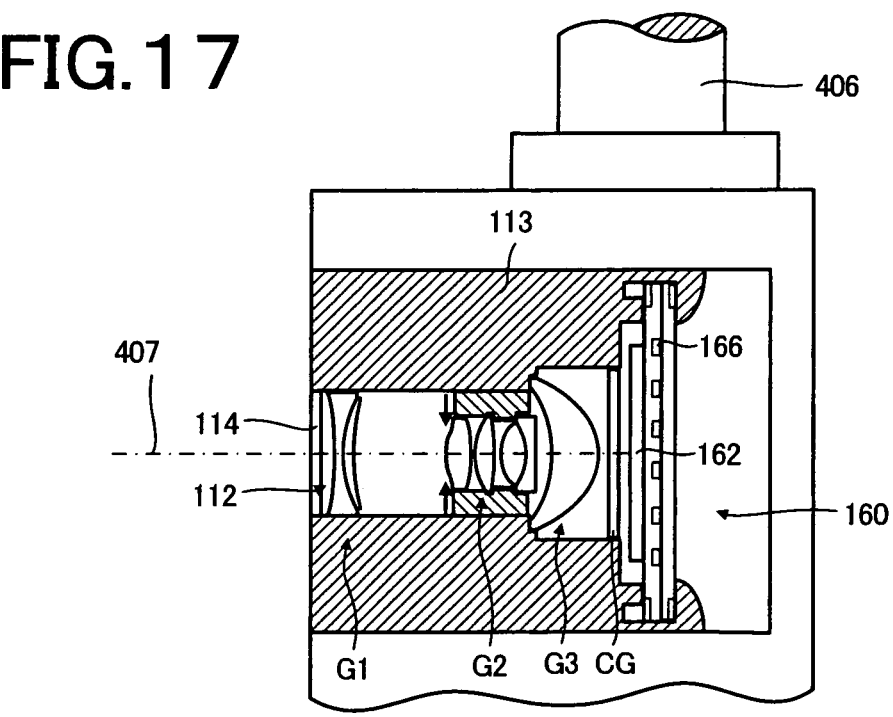
FIG. 17 is a sectional view of an image-taking optical system in the cellular phone.

FIG. 15 is illustrative of one typical example of the information processing means having a zoom optical system built in as an image-taking optical system: a phone, especially a convenient-to-carry-around cellular phone. FIG. 15 is a front view of a cellular phone 400; FIG. 16 is a side view of the same; and FIG. 17 is a sectional view of an image-taking optical system 405. As shown in FIGS. 15, 16 and 17, the cellular phone 400 includes a microphone 401 via which the voice of the operator is entered as information in it, a speaker 402 via which the voice of a person at the other end is produced, an input dial 403 via which the operator enters information, a monitor 404 for displaying the image taken of the operator or the person at the other end as well as information such as telephone numbers, an image-taking optical system 405, an antenna 406 for transmission and reception of communication waves, and processing means (not shown) for image information, communication information, input signals, and so on. The monitor 404 here is a liquid crystal display device. The locations of the parts are not always limited to what is shown in FIGS. 15, 16 and 17. The image-taking optical system 405 includes an objective lens 112 comprising an image-formation optical system (roughly shown) located on an image-taking optical path 407 and an imaging device chip 162 for receiving an object image, each built in the cellular phone 400.

Here a cover glass CG functioning as a low-pass filter is additionally applied onto the imaging device chip 162 to form an integrated-form imaging unit 160, and the imaging unit 160 is detachably fitted over the rear end of the lens barrel 113 of the objective lens 112 in one-touch operation; so any centering alignment or surface separation adjustment of the objective lens 112 and imaging device chip 162 may be dispensed with, resulting in simplified assembling. The lens barrel 113 is provided at its end with a cover glass 114 for protection of the objective lens 112.

An object image received at the imaging device chip 162 is entered in processing means (not shown) via a terminal 166 so that it is displayed as an electronic image on the monitor 404 and/or a monitor at the other end. To transmit an image to the person at the other end, the processing means may include a signal processing function of converting information about the object image received at the imaging device chip 162 into transmittable signals.

The foregoing examples or embodiments may be variously modified pursuant to what is recited in the appended claims.

What is claimed is:

1. A zoom optical system, which comprises, in order from an object side thereof, a first lens group, a second lens group and a third lens group and adapted to implement zooming by varying a spacing between the lens groups, and in which there is a lens group that is located on an image plane side with respect to a stop, includes a plurality of lenses and has a positive refracting power as a whole,
wherein
the lens group having positive refracting power includes therein a first lens and a second lens in order from the object side,
an image plane side surface of the first lens is convex toward the object side, and
an object side surface of the second lens is concave toward the object side, with satisfaction of the following Condition (1):

$$-0.5 \leq (Ra1+Ra2)/(Ra1-Ra2) \leq 0.5 \quad (1)$$

where Ra1 is a radius of curvature of the image plane side surface of the first lens, and Ra2 is a radius of curvature of the object side surface of the second lens.

2. The zoom optical system according to claim 1, wherein the second lens group satisfies the following Condition (2):

$$0.2 \leq |f2|/\{(fw \cdot ft)^{1/2}\} \leq 1.0 \quad (2)$$

where f2 is a focal length of the second lens group, fw is a focal length of the optical system at a wide-angle end, and ft is a focal length of the optical system at a telephoto end.

3. The zoom optical system according to claim 1, wherein the third lens group satisfies the following Condition (3):

$$0.2 \leq (R4a+R4b)/(R4a-R4b) \leq 5.0 \quad (3)$$

where R4a is a radius of curvature of a surface of the third lens group on an object side, and R4b is a radius of curvature of a surface of the third lens group on an image plane side.

4. The zoom optical system according to claim 1, wherein the second lens group includes two back-to-back lenses of negative refracting power.

5. The zoom optical system according to claim 1, wherein the second lens group comprises at least four lenses: lenses having positive, positive, negative and negative refracting powers in order from an object side.

6. The zoom optical system according to claim 1, wherein the first lens group remains fixed during zooming from a wide-angle end to a telephoto end or during imaging at infinity to close-range imaging.

7. An imaging apparatus, which includes a zoom optical system as recited in claim 1, and an imaging device located on an image side of the zoom optical system and having an image pickup surface for converting an optical image into electric signals.

* * * * *

UNITED STATES PATENT AND TRADEMARK OFFICE
CERTIFICATE OF CORRECTION

PATENT NO. : 8,503,090 B2  Page 1 of 1
APPLICATION NO. : 13/134287
DATED : August 6, 2013
INVENTOR(S) : Kanato Adachi It is certified that error appears in the above-identified patent and that said Letters Patent is hereby corrected as shown below:

On the Title Page of the patent at (73), "Olympus Imaging Corp." should be changed to --Olympus Corporation--.

Signed and Sealed this
Twenty-eighth Day of January, 2014

Michelle K. Lee
*Deputy Director of the United States Patent and Trademark Office*